US009509495B2

(12) United States Patent
Lee et al.

(10) Patent No.: US 9,509,495 B2
(45) Date of Patent: Nov. 29, 2016

(54) DATA PROTECTION METHOD AND APPARATUS

(71) Applicants: Samsung Electronics Co., Ltd., Gyeonggi-do (KR); SNU R&DB Foundation, Seoul (KR)

(72) Inventors: Kyunghee Lee, Gyeonggi-do (KR); Junghee Cheon, Seoul (KR); Eunyoung Kwon, Seoul (KR); Bumhan Kim, Gyeonggi-do (KR); Jinsu Kim, Seoul (KR); Hongtae Kim, Chungcheongbuk-do (KR); Hansol Ryu, Seoul (KR); Hyunsook Hong, Seoul (KR)

(73) Assignees: Samsung Electronics Co., Ltd (KR); SNU R&DB Foundation (KR)

( * ) Notice: Subject to any disclaimer, the term of this patent is extended or adjusted under 35 U.S.C. 154(b) by 89 days.

(21) Appl. No.: 14/455,257

(22) Filed: Aug. 8, 2014

(65) Prior Publication Data

US 2015/0043731 A1    Feb. 12, 2015

(30) Foreign Application Priority Data

Aug. 8, 2013 (KR) .................. 10-2013-0093957

(51) Int. Cl.
*H04L 29/06* (2006.01)
*H04L 9/06* (2006.01)
*G09C 1/00* (2006.01)

(52) U.S. Cl.
CPC ............... *H04L 9/0631* (2013.01); *G09C 1/00* (2013.01); *H04L 2209/12* (2013.01)

(58) Field of Classification Search
CPC .... H04L 9/0631; H04L 2209/12; G06C 1/00

USPC .................................................. 380/42, 270
See application file for complete search history.

(56) References Cited

U.S. PATENT DOCUMENTS

| | | | |
|---|---|---|---|
| 7,397,916 B2 | 7/2008 | Johnson et al. | |
| 7,809,135 B2 | 10/2010 | Johnson et al. | |
| 8,565,421 B1* | 10/2013 | Bhooma | H04L 9/0631 380/29 |
| 2002/0191784 A1* | 12/2002 | Yup | H04L 9/0631 380/37 |
| 2003/0198345 A1* | 10/2003 | Van Buer | H04L 9/0631 380/43 |
| 2003/0219118 A1* | 11/2003 | Beverly | G06F 7/726 380/28 |
| 2005/0207571 A1* | 9/2005 | Ahn | H04L 9/003 380/28 |
| 2006/0002548 A1* | 1/2006 | Chu | H04L 9/0631 380/28 |
| 2009/0172068 A1* | 7/2009 | Kounavis | G06F 7/00 708/606 |
| 2010/0086126 A1* | 4/2010 | Yokota | H04L 9/003 380/28 |
| 2012/0170739 A1* | 7/2012 | Karroumi | H04L 9/0631 380/28 |
| 2015/0349951 A1* | 12/2015 | Farrugia | H04L 9/0631 380/28 |

* cited by examiner

*Primary Examiner* — Sarah Su
(74) *Attorney, Agent, or Firm* — The Farrell Law Firm, P.C.

(57) ABSTRACT

A data protection method and apparatus that can protect data through encryption using a Boolean function is provided. The data protection method includes applying an inverse affine transformation to data to be encrypted using a Boolean function; applying round operations of an Advanced Encryption Standard (AES) cryptographic algorithm to the inverse-affine transformed data; and producing ciphertext data by applying an affine transformation to the result of the round operations.

19 Claims, 6 Drawing Sheets

FIG. 6

$$\begin{bmatrix} \star & \star & \star & \star & 0 & 0 & 0 & 0 \\ \star & \star & \star & \star & 0 & 0 & 0 & 0 \\ \star & \star & \star & \star & 0 & 0 & 0 & 0 \\ \star & \star & \star & \star & 0 & 0 & 0 & 0 \\ \star & \star & \star & \star & 0 & 0 & 0 & 0 \\ \star & \star & \star & \star & 0 & 0 & 0 & 0 \\ \star & \star & \star & \star & 0 & 0 & 0 & 0 \\ \star & \star & \star & \star & 0 & 0 & 0 & 0 \end{bmatrix}$$

DATA PROTECTION METHOD AND APPARATUS

PRIORITY

This application claims priority under 35 U.S.C. §119(a) to Korean Patent Application filed in the Korean Intellectual Property Office on Aug. 8, 2013 and assigned Serial No. 10-2013-0093957, the entire disclosure of which is herein incorporated by reference.

BACKGROUND OF THE INVENTION

1. Field of the Invention

The present invention relates generally to a method and apparatus for data protection, and more particularly, to a method and apparatus that protects data through encryption using a Boolean function.

2. Description of the Related Art

Rapid advances in information and communication technologies and semiconductor technologies have contributed to the popularization of electronic devices. As electronic devices are portable and provide a variety of functions needed by users, they have become a necessity of modern life. For example, such an electronic device may provide various functions related to calls, image or moving image capture, broadcast reception, Internet access, and map services.

Electronic devices may provide an electronic payment function related to, for example, transportation cards, credit cards, and mobile banking. Electronic devices are increasingly used to store digital content of users, such as music files, video files, and authentication certificates. As such, techniques for securing payment information transmitted and received for payment and/or techniques for preventing illegal copy of digital content (e.g. encryption) have attracted increasing attention in recent years. For example, a first electronic device may encrypt confidential data and send the encrypted data to a second electronic device. Upon reception of the encrypted data, the second electronic device must decrypt the received data into the original data.

White-box cryptography, which can safely manage a cipher key through software only and prevent a cryptographic algorithm executed on an untrusted terminal from exposing the cipher key, has attracted attention. However, white-box cryptography may be vulnerable to a certain algebraic attack. For example, white-box Advanced Encryption Standard (AES) implementation based on look-up tables may have a complexity of $2^{28}$. The cipher key can be extracted by use of a specially designed algebraic attack, but such an extracted cipher key may be misused by a hacker to decrypt encrypted data.

SUMMARY OF THE INVENTION

The present invention has been made to address at least the above mentioned problems and/or disadvantages and to provide at least the advantages described below.

Accordingly, an aspect of the present invention is to provide a data protection method and apparatus that can safely protect data against an algebraic attack.

Another aspect of the present invention is to provide a data protection method and apparatus that can safely protect data against an algebraic attack using encryption based on a Boolean function and the Advanced Encryption Standard (AES) algorithm.

In accordance with an aspect of the present invention, a data protection method is provided. The data protection method includes applying an inverse affine transformation to data to be encrypted using a Boolean function; applying round operations of an Advanced Encryption Standard (AES) cryptographic algorithm to the inverse-affine transformed data; and producing ciphertext data by applying an affine transformation to the result of the round operations.

In accordance with another aspect of the present invention, a data protection apparatus is provided. The data protection apparatus includes a storage unit configured to store data; and an encryption part configured to apply an inverse affine transformation to data to be encrypted using a Boolean function, to apply round operations of an AES cryptographic algorithm to the inverse-affine transformed data, and to produce ciphertext data by applying an affine transformation to the result of the round operations.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 6 is a diagram illustrating a sub-matrix used to reduce the amount of memory according to an embodiment of the present invention.

DETAILED DESCRIPTION OF EMBODIMENTS OF THE PRESENT INVENTION

Hereinafter, embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

The following description with reference to the accompanying drawings is provided to assist in a comprehensive understanding of various embodiments of the present invention. It includes various specific details to assist in that understanding but these are to be regarded as mere examples. Accordingly, those of ordinary skill in the art will recognize that various changes and modifications of the embodiments described herein can be made without departing from the scope and spirit of the present invention.

The electronic device of the present invention may be a mobile communication terminal, smartphone, tablet computer, handheld computer, Portable Multimedia Player (PMP), Personal Digital Assistant (PDA), laptop computer, desktop computer, or the like.

In a feature of the present invention, the data protection method and apparatus can safely protect data against an attack like hacking. For example, various embodiments can prevent extraction of the cipher key using an algebraic attack and hence may safely protect data. To this end, input and output variations are enlarged by use of a Boolean function during encoding; keys are protected by key randomization; one round function (e.g. S-box) is influenced by multiple inputs; and some operations of the AES cryptographic algorithm are utilized.

Figure 1:
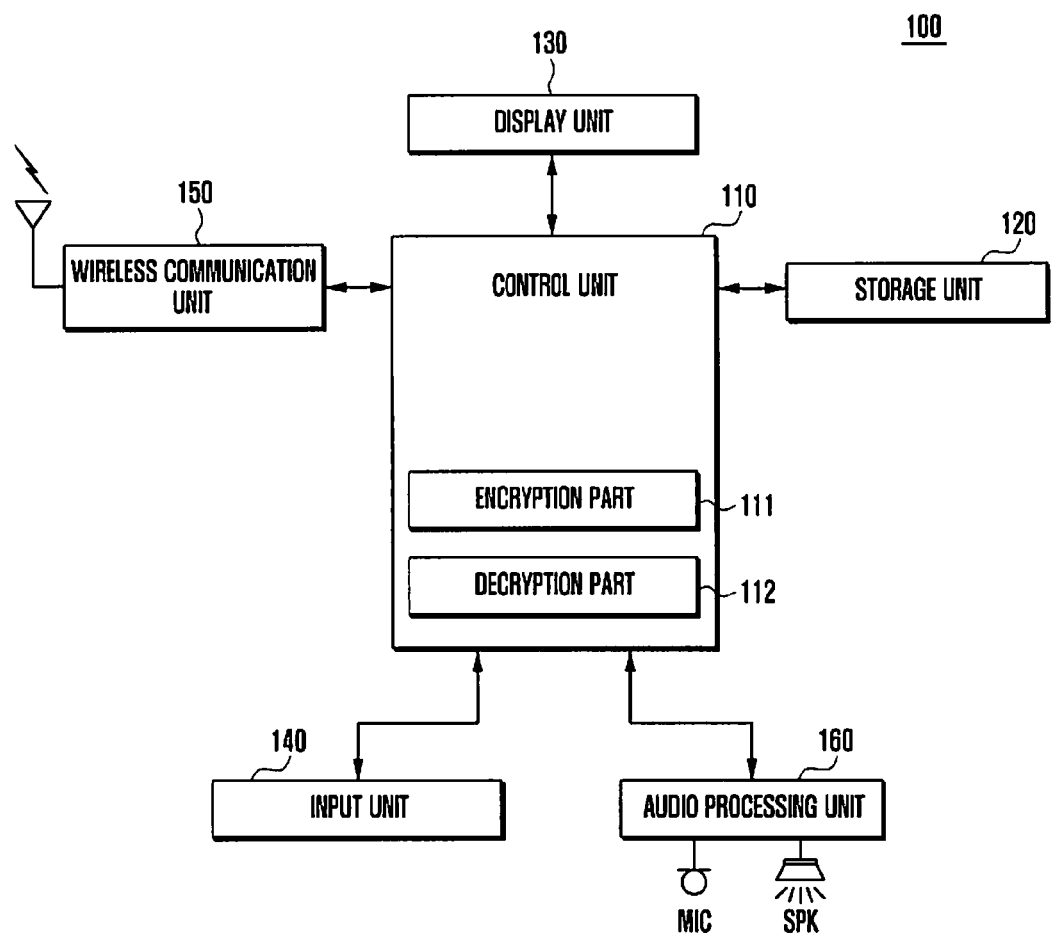
FIG. 1 is a block diagram of an electronic device according to an embodiment of the present invention.

FIG. 1 is a block diagram of an electronic device 100 according to an embodiment of the present invention.

Referring to FIG. 1, the electronic device 100 includes a control unit 110, a storage unit 120, a display unit 130, an input unit 140, a wireless communication unit 150, and an audio processing unit 160. The control unit 110 includes an encryption part 111 and a decryption part 112.

The audio processing unit 160 includes a speaker SPK to output audio signals sent and received during a call or generated during playback of an audio file stored in the storage unit 120, and a microphone MIC to collect an audio signal such as a voice signal of the user.

The wireless communication unit 150 supports wireless communication for the electronic device 100. For example, the wireless communication unit 150 may include a mobile communication module (based on 2G, 3G or 4G mobile communication) to support mobile communication and a local area communication module to support local area or short-range communication. The mobile communication module enables the electronic device 100 in motion to perform voice and data communication. For instance, the mobile communication module may send and receive encrypted data to and from another electronic device under control of the control unit 110.

The local area communication module may support local area or short-range communication based on Bluetooth®, ZigBee®, Wi-Fi, Wi-Fi Direct or Near Field Communication (NFC). The local area communication module may send and receive encrypted data to and from another electronic device under control of the control unit 110.

The input unit 140 may include a plurality of alphanumeric and function keys for inputting alphanumeric information and for setting various functions. The function keys may include direction, side and shortcut keys mapped with specific functions. The input unit 140 generates key signals for user settings and for controlling the electronic device 100 and sends the key signals to the control unit 110. The input unit 140 may be realized using one of various input means, such as a QWERTY keypad, a 3*4 keypad, a 4*3 keypad, a ball joystick, an optical joystick, a wheel key, a touch key, a touch pad, a touchscreen, a mouse and a keyboard, or a combination thereof. When the electronic device 100 supports a full touchscreen feature, the input unit 140 may include only some function keys such as a volume key, power key, cancel key, and home key.

The display unit 130 is configured to display various menus of the electronic device 100, information input by the user, and information to be provided to the user. The display unit 130 may be realized using Liquid Crystal Display (LCD) devices, Organic Light Emitting Diodes (OLED), or Active Matrix Organic Light emitted diodes (AMOLED). The display unit 130 outputs various screens in the course of using the electronic device 100, such as a home screen, menu screen, webpage output screen, and call handling screen. In the event that the display unit 130 supports a touchscreen capability, the display unit 130 can also act as an input means.

The storage unit 120 stores an Operating System (OS) of the electronic device 100, and stores application programs needed for audio playback, image or video playback, broadcast reception, Internet access, and the like. The storage unit 120 stores a variety of data such as moving image files, game files, music files, movie files and map files. In particular, the storage unit 120 may store an encryption program utilizing a Boolean function and the AES cryptographic algorithm. The encryption program may include a routine for applying an inverse affine transformation based on a Boolean function to data to be protected, a routine to apply round operations of the AES cryptographic algorithm to the inverse affine-transformed data, and a routine to produce encrypted data by applying an affine transformation to the result of the round operations. The routine to apply round operations may include a routine for the AddRoundKey operation applying round keys, a routine for the SubBytes operation replacing each byte of the state with a corresponding entry of a lookup table, a routine for the ShiftRows operation cyclically shifting bytes in each row of the state to the left, and a routine for the MixColumns operation combining four bytes in each column of the state. The round operations may be repeated for a preset number of rounds (e.g. 10 rounds), and the MixColumns operation may not be performed in the final round.

In addition, the storage unit 120 stores a decryption program to decrypt encrypted data into plaintext data. The decryption program may invoke the encryption routines in reverse order.

The control unit 110 controls the overall operation of the electronic device 100, controls signal exchange between internal components thereof, and performs data processing. The control unit 110 may include a Central Processing Unit (CPU) and an Application Processor (AP). For example, the control unit 110 may be composed of a single core processor or a multi-core processor.

The control unit 110 controls procedures for encryption and decryption to protect data and to decrypt encrypted data. To this end, the control unit 110 includes the encryption part 111 and the decryption part 112.

The encryption part 111 applies an inverse affine transformation using a Boolean function to data to be protected, applies round operations of the AES cryptographic algorithm to the inverse-affine transformed data, and applies an affine transformation to the result of the round operations to produce the encrypted data. Here, the encryption part 111 may repeat the above procedure for a preset number of rounds (e.g. 10 rounds).

The decryption part 112 decrypts encrypted data into plaintext data. Specifically, to perform decryption, the decryption part 112 may perform operations of the encryption procedure in reverse order.

Although not shown in FIG. 1, the electronic device 100 may further include at least one of a camera module for capturing images or moving images and for a video call, a broadcast reception module for receiving broadcasts, a music playback module (such as an MP3 module), and an Internet communication module for Internet access (such as a Wi-Fi communication module). Although possible variations according to the trend of digital convergence are too numerous to enumerate, it should be apparent to those skilled in the art that the electronic device 100 of the present invention may further include a unit comparable to the above-described units.

Figure 2:
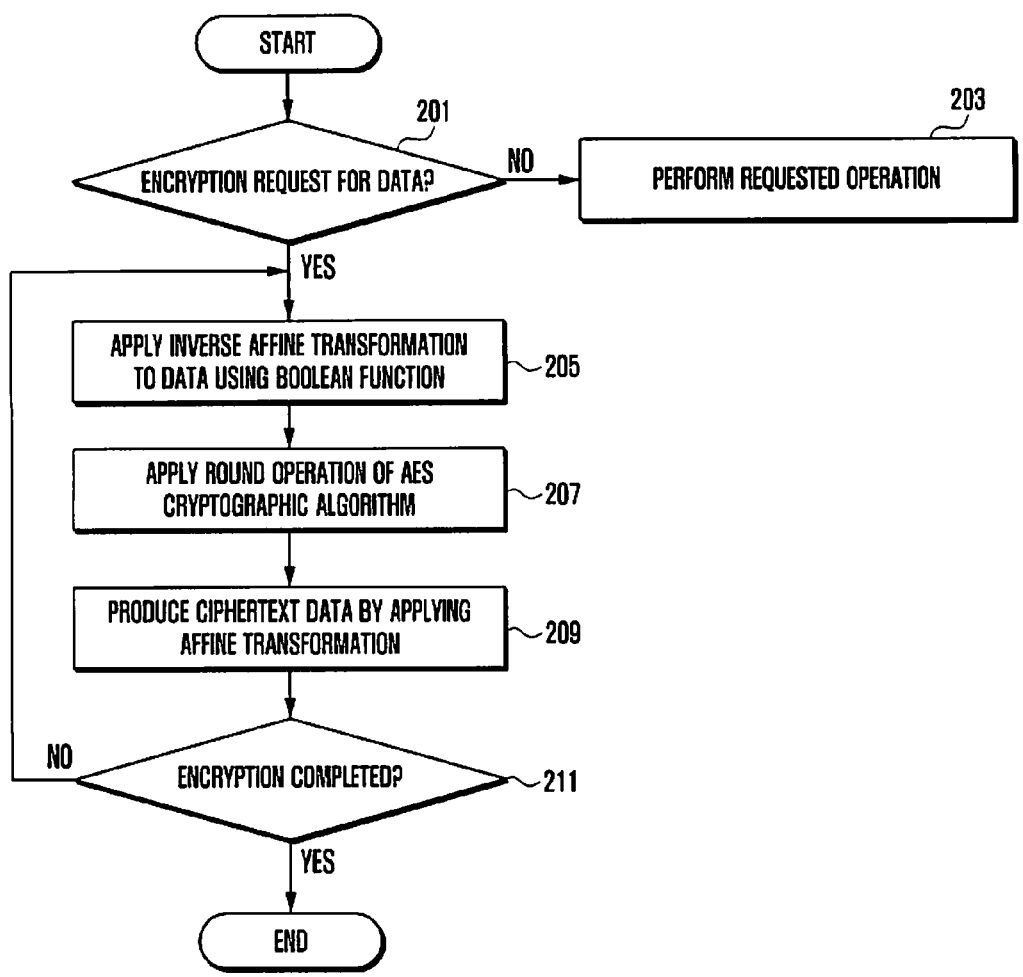
FIG. 2 is a flowchart of an encryption method for data protection according to an embodiment of the present invention.

FIG. 2 is a flowchart of an encryption method for data protection according to an embodiment of the present invention.

Referring to FIG. 2, at step 201, the control unit 110 of the electronic device 100 checks whether an encryption request for data is detected. For example, an encryption request may be generated when data requiring security such as payment information is sent. An encryption request may also be generated when copyrighted digital content is encrypted. Encryption requests may be issued in other situations requiring data encryption.

If an encryption request is not detected, the control unit 110 proceeds to step 203 at which the control unit 110 performs a requested function. For example, the control unit 110 may perform music playback, perform video playback, or remain in a standby state according to a user request. The control unit 110 receives encrypted data and decrypts the encrypted data into plaintext data.

If an encryption request for data is detected, the control unit 110 proceeds to step 205 at which the control unit 110 applies an inverse affine transformation to the data using a Boolean function. In Boolean algebra, variables take truth values (usually denoted 1 and 0). The main operations of Boolean algebra are the conjunction (logical AND), the disjunction (logical OR), and the negation (NOT). Boolean functions are used for designing and analyzing combinatorial logic circuits.

At step 207, the control unit 110 applies round operations of the AES cryptographic algorithm to the inverse-affine transformed data. The application of round operations is repeated for a preset number of rounds (e.g. 10 rounds), and the final round is slightly different from the preceding rounds. For example, the AddRoundKey operation applying the round key, the SubBytes operation replacing each byte of the state with a corresponding entry of a lookup table, the ShiftRows operation cyclically shifting bytes in each row of the state, and the MixColumns operation combining four bytes in each column of the state are repeatedly performed in each round except for the final round. In the final round, the SubBytes, ShiftRows and AddRoundKey operations are performed (the MixColumns operation is excluded). As the operations of the AES cryptographic algorithm have been standardized, a detailed description thereof is omitted.

At step 209, the control unit 110 produces the encrypted data (e.g., ciphertext) by applying an affine transformation to the result of the round operations.

At step 211, the control unit 110 checks whether encryption is completed. If encryption is not completed, the control unit 110 returns to step 205 and continues data encryption. If encryption is completed, the control unit 110 ends the encryption procedure. Here, although not shown, the control unit 110 may send the encrypted data to another electronic device.

Figure 3:
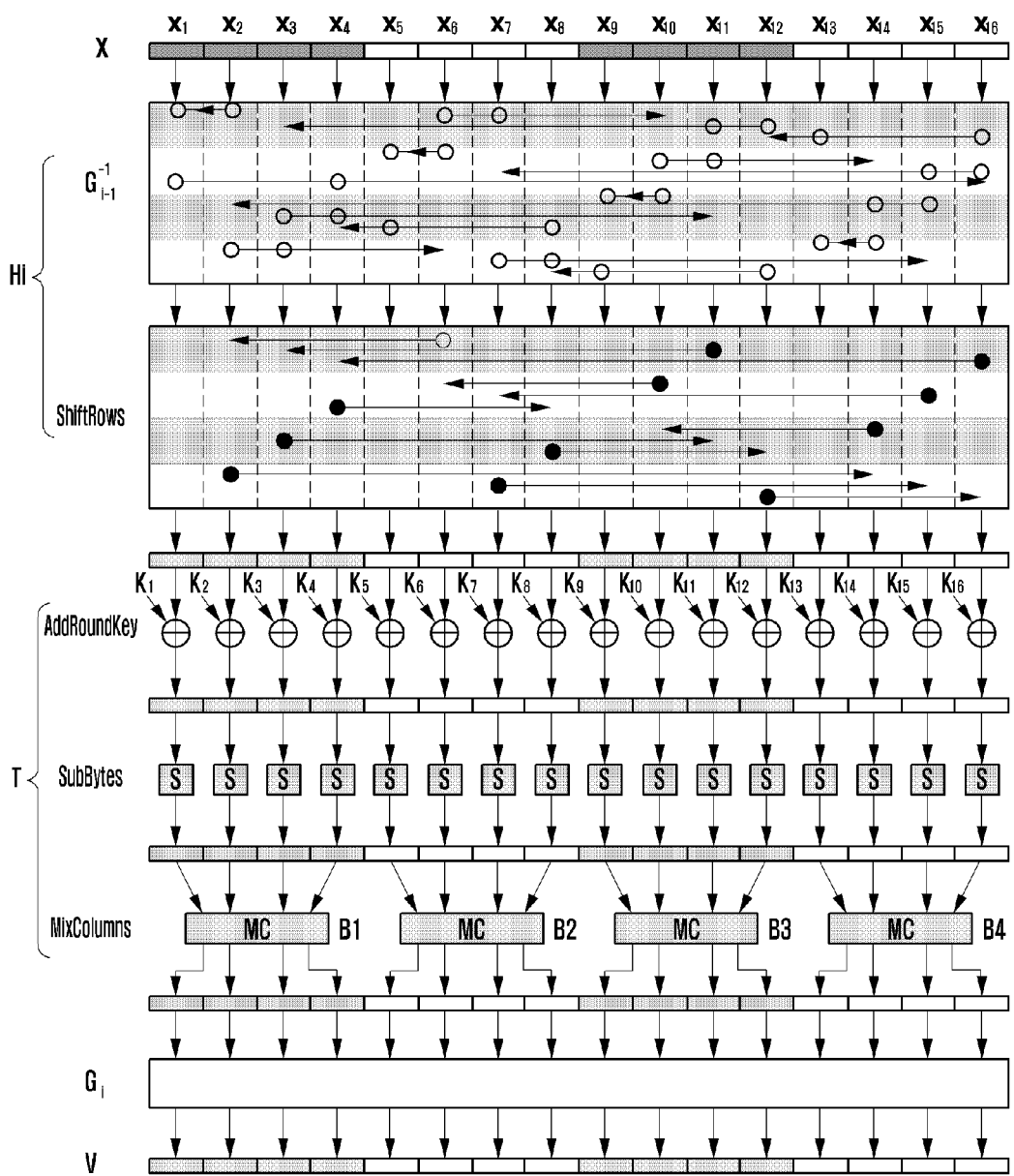
FIG. 3 is a diagram depicting the data flow in steps of the encryption method according to an embodiment of the present invention.
Figure 4:
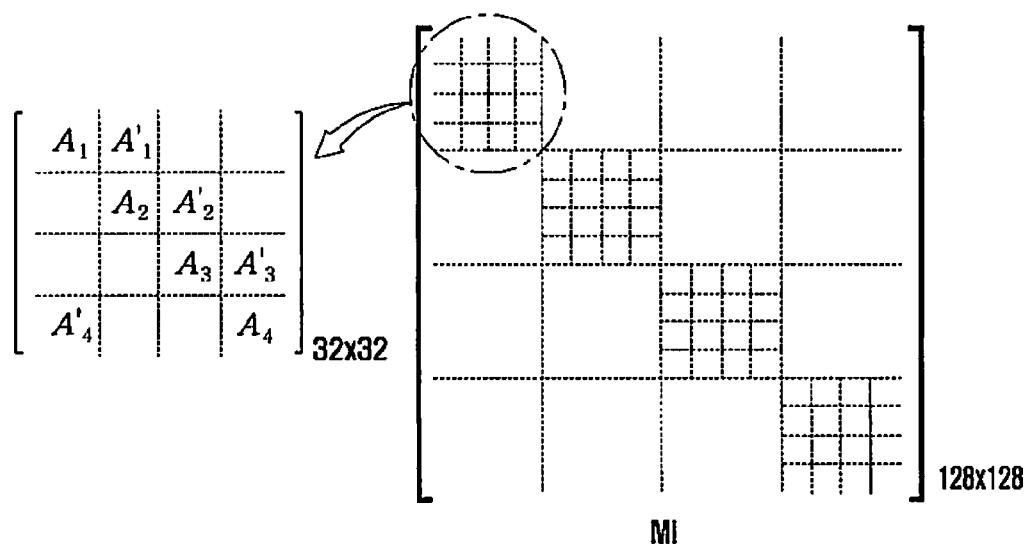
FIG. 4 is a diagram illustrating the form of a matrix used for linear transformation serving as input decoding according to an embodiment of the present invention.

FIG. 3 depicts the data flow in steps of the encryption method according to an embodiment of the present invention; FIG. 4 illustrates the form of a block matrix used for linear transformation serving as input decoding according to an embodiment of the present invention; and FIG. 5 illustrates the form of a block matrix used for linear transformation serving as output encoding according to an embodiment of the present invention.

Figure 5:
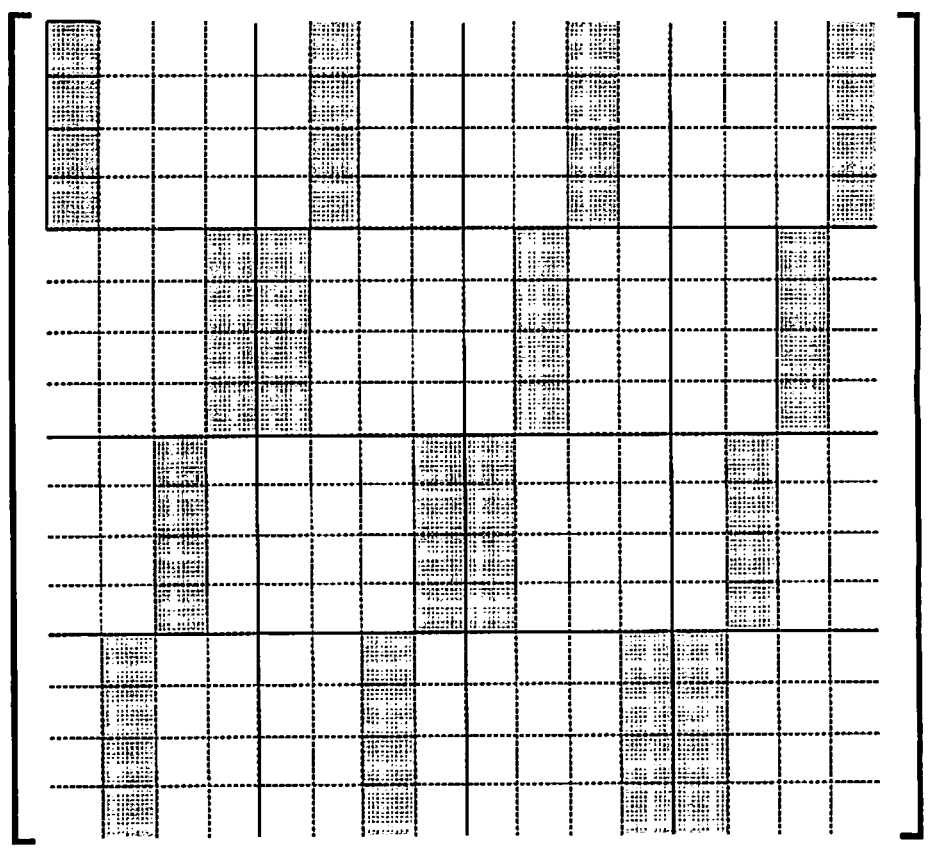
FIG. 5 is a diagram illustrating the form of a matrix used for linear transformation serving as output encoding according to an embodiment of the present invention.

Referring to FIGS. 3 to 5, the encryption method encrypts data in units of 128 bits. However, the present invention is not limited thereto. In FIG. 3, the plaintext data (X) may be composed of x1, x2, . . . , x16, each of which is 8 bits.

Referring to FIG. 3, the ciphertext data (V) may be given by Equation (1):

$$V = G_1 \bigcirc T \bigcirc H_i = G_i \bigcirc MC \bigcirc SB \bigcirc AK \bigcirc H_i \qquad (1)$$

Here, $H_i$ is input decoding given by $SR \bigcirc G_{i-1}^{-1}$, and $G_i$ is an affine transformation $\{0,1\}^{128} \to \{0,1\}^{128}$. AK, SB and MC correspond respectively to the AddRoundKey, SubBytes and MixColumns operations.

In Equation (1), input decoding $H_i$ includes only the SR (ShiftRows) operation among the operations of the AES cryptographic algorithm. However, the present invention is not limited thereto. That is, input decoding $H_i$ may include a different operation among the operations of the AES cryptographic algorithm.

Input decoding $H_i: \{0,1\}^{128} \to \{0,1\}^{128}$ is an affine transformation that may be represented as Equation (2):

$$H_i \begin{bmatrix} x_1 \\ x_2 \\ \vdots \\ x_{16} \end{bmatrix} = M_i \begin{bmatrix} x_1 \\ x_2 \\ \vdots \\ x_{16} \end{bmatrix} + \begin{bmatrix} \overline{k}_1 \\ \overline{k}_2 \\ \vdots \\ \overline{k}_{16} \end{bmatrix} = \begin{bmatrix} A_1 x_1 + A'_1 x_2 + \overline{k}_1 \\ A_2 x_2 + A'_2 x_3 + \overline{k}_2 \\ \vdots \\ A_{16} x_{16} + A'_{16} x_{13} + \overline{k}_{16} \end{bmatrix} \qquad (2)$$

Here, i=1, 2, . . . , 16. $\overline{k}_i \in \{0,1\}^8$ indicates key randomization (or key obfuscation). $M_i \in GL_{128}(Z_2)$ is linear and includes sub-matrices $A_i$ and $A'_i \in GL_8(Z_2)$. For example, $M_i$ may be represented as shown in FIG. 4. $M_i$ has a size of 128×128 and includes 16 block matrices each having a size of 32×32. One block matrix includes sub-matrices $A_i$ and $A'_i$ each having a size of 8×8. In one embodiment, the rank of the sub-matrices may be reduced to decrease the amount of memory.

In FIG. 4, the positions of sub-matrices $A_i$ and $A'_i$ may be varied and different matrices may be utilized. In FIG. 4, two inputs ($A_i$ and $A'_i$) influence the S-box operation. However, in another embodiment, more than two inputs may influence the S-box operation.

The transformation $T \bigcirc H_i$ may be represented by Equation (3):

$$T \circ H_i \begin{bmatrix} x_1 \\ x_2 \\ \vdots \\ x_{16} \end{bmatrix} = \qquad (3)$$

$$\begin{bmatrix} S(A_1 x_1 + A'_1 x'_1 + k'_1)[B_1] + \cdots + S(A_4 x_4 + A'_4 x'_4 + k'_4)[B_4] \\ S(A_5 x_5 + A'_5 x'_5 + k'_5)[B_1] + \cdots + S(A_8 x_8 + A'_8 x'_8 + k'_8)[B_4] \\ \vdots \\ S(A_{13} x_{13} + A'_{13} x'_{13} + k'_{13})[B_1] + \cdots + S(A_{16} x_{16} + A'_{16} x'_{16} + k'_{16})[B_4] \end{bmatrix}$$

In Equation (3), $k'_i = \overline{k}_i + k_i$ ($k_i$: AES byte key); if i≡0 mod 4, $x'_i = x_{i-3}$; and if i≢0 mod 4, $x'_i = x_{i+1}$.

The addition operation (+) is used for key randomization to protect keys in Equation 3. However, the present invention is not limited thereto. For example, other operations such as the minus operation (−) and multiplication operation (×) may also be used.

Here, let MC=[B1|B2|B3|B4] and let S be the S-box operation. Then, Equation (3) may be rewritten as Equation (4):

$$T \circ H_i \begin{bmatrix} x_1 \\ x_2 \\ \vdots \\ x_{16} \end{bmatrix} = \begin{bmatrix} \overline{F}_1(x_1, x_2) + \overline{F}_2(x_2, x_3) + \overline{F}_3(x_3, x_4) + \overline{F}_4(x_4, x_1) \\ \overline{F}_5(x_5, x_6) + \overline{F}_6(x_6, x_7) + \overline{F}_7(x_7, x_8) + \overline{F}_8(x_8, x_5) \\ \vdots \\ F_{13}(x_{13}, x_{14}) + \overline{F}_{14}(x_{14}, x_{15}) + \\ \overline{F}_{15}(x_{15}, x_{16}) + \overline{F}_{16}(x_{16}, x_{13}) \end{bmatrix} = \quad (4)$$

$$\begin{bmatrix} \overline{f}_{1,1} + \overline{f}_{2,1} + \overline{f}_{3,1} + \overline{f}_{4,1} \\ \overline{f}_{1,2} + \overline{f}_{2,2} + \overline{f}_{3,2} + \overline{f}_{4,2} \\ \vdots \\ \overline{f}_{13,32} + \overline{f}_{14,32} + \overline{f}_{15,32} + \overline{f}_{16,32} \end{bmatrix} = \begin{bmatrix} \overline{g}_1 \\ \overline{g}_2 \\ \vdots \\ \overline{g}_{128} \end{bmatrix}$$

In Equation (4), $$\overline{F}_i(x_i, x_i') = F_{(i \bmod 4)}(A_i x_i + A_i' x_i' + k_i') = \begin{bmatrix} \overline{f}_{i,1} \\ \overline{f}_{i,2} \\ \vdots \\ \overline{f}_{i,32} \end{bmatrix}$$

and $\overline{f}_{i,j}$ is a transformation $\{0, 1\}^{16} \rightarrow \{0, 1\}$.

Hence, $g_{32i+j}$, $i=0, 1, 2, 3$, $j=1, 2, \ldots, 32$ each is composed of 4 input bytes $x_{4i+1}, \ldots, x_{4i+4}$, $i=0, 1, 2, 3$.

Finally, the transformation $G_i \bigcirc T \bigcirc H_i$ may be represented as Equation (5):

$$G_i \circ T \circ H_i \begin{bmatrix} x_1 \\ x_2 \\ \vdots \\ x_{16} \end{bmatrix} = G_i \circ MC \circ SB \circ AK \circ H_i \begin{bmatrix} x_1 \\ x_2 \\ \vdots \\ x_{16} \end{bmatrix} = G_i \begin{bmatrix} \overline{g}_1 \\ \overline{g}_5 \\ \vdots \\ \overline{g}_{128} \end{bmatrix} = \begin{bmatrix} g_1' \\ g_5' \\ \vdots \\ g_{128}' \end{bmatrix} \quad (5)$$

In Equation (5), the linear portion of output encoding $G_i$ may be represented as a matrix shown in FIG. 5. In the matrix shown in FIG. 5, non-gray parts are all zeros.

In the encryption method of the present invention having the above operations, $\overline{f}_{i,j}$ has $2^{14.7}$ coefficients of monomials and $g_i'$ is composed of 16 ($=2^4$) $\overline{f}_{i,j}$. Hence, in one embodiment, $g_i'$ may be stored as $2^{18.7}$ bits. Therefore, the total amount of cryptographic data is about 64 MB.

Meanwhile, although not shown, it is possible to decrypt encoded data into plaintext by executing the above operations of the encryption procedure in reverse order. Specifically, assuming that the number of rounds is 10, the first round of the decryption procedure may be represented as Equation (6):

$$G_1 \bigcirc IMC \bigcirc AK \bigcirc ISB \bigcirc AK' \bigcirc H_1 \quad (6)$$

The two to ninth rounds may be represented as Equation (7):

$$G_i \bigcirc IMC \bigcirc AK \bigcirc ISB \bigcirc H_i \quad (7)$$

The tenth round may be represented as Equation (8):

$$G_{10} \bigcirc AK \bigcirc ISB \bigcirc H_{10} \quad (8)$$

In Equations (6)-(8), IMC indicates the inverse MixColumns operation, ISB indicates the inverse SubBytes operation, and ISR indicates the inverse ShiftRows operation.

FIG. 6 illustrates a sub-matrix used to reduce the amount of memory according to an embodiment of the present invention.

The encryption method described above may require a relatively large amount of memory. To address this, the Hamming weight may be set to 12 or less in one embodiment. For example, referring to FIG. 4, all elements in some columns of one of the sub-matrices (Ai and Ai') may be set to zero. As another example, as shown in FIG. 6, all elements in the latter four columns of each sub-matrix (Ai or Ai') may be set to zero.

Here, assuming that the Hamming weight is set to 12, $\overline{f}_{i,j}$ has $2^{11.7}$ coefficients of monomials and $g_i'$ is composed of 16 ($=2^4$) $\overline{f}_{i,j}$. Hence, in one embodiment, $g_i'$ may be stored as $2^{15.7}$ bits. Therefore, the total amount of cryptographic data may be reduced to about 10.5 MB. As described above, the amount of memory may be reduced by limiting the Hamming weight.

The data protection method of the present invention may be implemented as computer programs and may be stored in various computer readable storage media. The computer readable storage media may store program instructions, data files, data structures and combinations thereof. The program instructions may include instructions developed specifically for the present invention and existing general-purpose instructions known to persons skilled in the art. The computer readable storage media may be hardware devices specially designed to store and execute program instructions, and may include magnetic media such as a hard disk, floppy disk and magnetic tape, optical media such as a CD-ROM and DVD, magneto-optical media such as a floptical disk, and memory devices such as a ROM, RAM and flash memory. The program instructions may include machine codes produced by compilers and high-level language codes executable through interpreters. Each hardware device may be replaced with one or more software modules to perform operations according to the present invention, and vice versa.

While the present invention has been particularly shown and described with reference to certain embodiments thereof, it will be understood by those of ordinary skill in the art that various changes in form and details may be made therein without departing from the spirit and scope of the present invention, as defined by the following claims and their equivalents.

What is claimed is:

1. A method for data protection, the method comprising:
   receiving a request to encrypt data using a Boolean function;
   applying, by a processor, an inverse affine transformation to the data to be encrypted using a Boolean function;
   applying, by the processor, round operations of an Advanced Encryption Standard (AES) cryptographic algorithm to the inverse-affine transformed data; and
   producing, by the processor ciphertext data by applying an affine transformation to the result of the round operations,
   wherein a storage unit stores data and instructions for performing the steps of applying an inverse affine transformation, applying round operations of an AES cryptographic algorithm, and producing the ciphertext.

2. The method of claim 1, wherein applying the round operations comprises:
   repeating, for a preset number of rounds, an AddRoundKey operation to apply a round key, a SubBytes operation to replace each byte of the state with a corresponding entry, a ShiftRows operation to cyclically shift bytes in each row of the state, and a MixColumns operation to combine specific bytes in each column of the state, and performing the SubBytes operation, the ShiftRows operation and the AddRoundKey operation in the final round.

3. The method of claim 2, wherein at least one of the round operations and the inverse affine transformation are combined to form input decoding.

4. The method of claim 3, wherein the at least one of the round operations combined with the inverse affine transformation comprises the ShiftRows operation.

5. The method of claim 3, wherein the input decoding is related to a linear transformation and key randomization.

6. The method of claim 5, wherein a matrix for the linear transformation is composed of multiple sub-matrices and all elements of at least one of the multiple sub-matrices are zeros.

7. The method of claim 6, wherein two sub-matrices among the multiple sub-matrices have non-zero elements, and all elements in at least one column of one of the two sub-matrices are zero.

8. The method of claim 7, wherein each sub-matrix has a size of 8×8 and the at least one column is among the latter four columns.

9. The method of claim 1, further comprising:
decrypting the ciphertext data into plaintext data.

10. An apparatus for data protection, the apparatus comprising:
a non-transitory computer-readable storage medium; and
a processor configured to execute program instructions stored in the non-transitory computer-readable storage medium, wherein the non-transitory computer-readable storage medium stores program instructions which, when executed by the processor in response to a request to encrypt data using a Boolean function, performs the following steps:
applying an inverse affine transformation to the data to be encrypted using a Boolean function;
applying round operations of an Advanced Encryption Standard (AES) cryptographic algorithm to the inverse-affine transformed data; and
producing ciphertext data by applying an affine transformation to the result of the round operations,
wherein a non-transitory computer-readable storage medium, which may or may not be the same non-transitory computer-readable storage medium which stores the program instructions for performing the steps above, stores data for performing the steps of applying an inverse affine transformation, applying round operations of an AES cryptographic algorithm, and producing the ciphertext.

11. The apparatus of claim 10, wherein the round operations are applied by repeating, for a preset number of rounds, an AddRoundKey operation to apply a round key, a SubBytes operation to replace each byte of the state with a corresponding entry, a ShiftRows operation to cyclically shift bytes in each row of the state, and a MixColumns operation to combine specific bytes in each column of the state, and performing the SubBytes operation, the ShiftRows operation and the AddRoundKey operation in the final round.

12. The apparatus of claim 11, wherein at least one of the round operations and the inverse affine transformation are combined to form input decoding.

13. The apparatus of claim 12, wherein the at least one of the round operations comprises the ShiftRows operation.

14. The apparatus of claim 12, wherein the input decoding is related to a linear transformation and key randomization.

15. The apparatus of claim 14, wherein a matrix for the linear transformation is composed of multiple sub-matrices and all elements of at least one of the multiple sub-matrices are zeros.

16. The apparatus of claim 15, wherein two sub-matrices among the multiple sub-matrices have non-zero elements, and all elements in at least one column of one of the two sub-matrices are zero.

17. The apparatus of claim 16, wherein each sub-matrix has a size of 8×8 and the at least one column is among the latter four columns.

18. The apparatus of claim 10, wherein the program instructions, when executed by the processor in response to a request to encrypt data using a Boolean function, also performs the following step:
decrypting the ciphertext data into plaintext data.

19. The apparatus of claim 10, further comprising:
a wireless communication unit to send and receive the ciphertext data.

* * * * *